United States Patent
Lakshmanamurthy et al.

(10) Patent No.: US 7,324,520 B2
(45) Date of Patent: Jan. 29, 2008

(54) METHOD AND APPARATUS TO PROCESS SWITCH TRAFFIC

(75) Inventors: Sridhar Lakshmanamurthy, Sunnyvale, CA (US); Lawrence B. Huston, San Jose, CA (US); Debra Bernstein, Sudbury, MA (US); Hugh M. Wilkinson, III, Newton, MA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 1192 days.

(21) Appl. No.: 10/188,419

(22) Filed: Jul. 3, 2002

(65) Prior Publication Data

US 2004/0004970 A1   Jan. 8, 2004

(51) Int. Cl.
 *H04L 12/28* (2006.01)
(52) U.S. Cl. .............. 370/394; 370/412; 370/473; 711/245
(58) Field of Classification Search ........... None
See application file for complete search history.

(56) References Cited

U.S. PATENT DOCUMENTS

| | | | |
|---|---|---|---|
| 6,654,373 B1* | 11/2003 | Maher, III et al. | 370/392 |
| 6,748,556 B1* | 6/2004 | Storino et al. | 714/42 |
| 6,944,168 B2* | 9/2005 | Paatela et al. | 370/401 |
| 7,042,842 B2* | 5/2006 | Paul et al. | 370/229 |
| 2002/0053016 A1* | 5/2002 | Wolrich et al. | 712/228 |
| 2002/0191543 A1* | 12/2002 | Buskirk et al. | 370/230.1 |
| 2003/0058880 A1* | 3/2003 | Sarkinen et al. | 370/413 |
| 2003/0063562 A1* | 4/2003 | Sarkinen et al. | 370/230 |
| 2003/0074473 A1* | 4/2003 | Pham et al. | 709/246 |
| 2003/0126297 A1* | 7/2003 | Olarig et al. | 709/250 |
| 2003/0202510 A1* | 10/2003 | Witkowski et al. | 370/386 |
| 2003/0202520 A1* | 10/2003 | Witkowski et al. | 370/400 |

* cited by examiner

*Primary Examiner*—Chau Nguyen
*Assistant Examiner*—Jung Park
(74) *Attorney, Agent, or Firm*—Grossman, Tucker, Perreault & Pfleger, PLLC

(57) ABSTRACT

A system and method for reassembling c-frames into coherent packets are disclosed. C-frames contain segments of a data set. A micro-engine operating multiple threads copies the data set segments into assigned queues, following a thread hierarchy to keep the segments in order. The queues are stored in SRAM. The micro-engine maintains a subset of the total number of queues in local memory. If a segment belongs to a queue not in local memory, the least recently used queue is copied to SRAM, the required queue is read from SRAM, and the queue is updated with the data set segment.

17 Claims, 5 Drawing Sheets

METHOD AND APPARATUS TO PROCESS SWITCH TRAFFIC

BACKGROUND INFORMATION

The present invention relates to switches. More specifically, the present invention relates to a method of reassembling common switch interface frame transmissions.

Line cards are often used to process data on a network line. Each line card acts as an interface between a network and a switching fabric. The line card may convert the data set from the format used by the network to a format for processing. The line card also may perform necessary processing on the data set. This processing may include further translation, encryption, error checking, and the like. After processing, the line card converts the data set into a transmission format for transmission across the switching fabric.

The line card also allows a data set to be transmitted from the switching fabric to the network. The line card receives a data set from the switching fabric, processes the data set, and then converts the data set into the network format. The network format can be asynchronous transfer mode (ATM; Multiprotocol Over ATM, Version 1.0, July 1998) or a different format.

With a common switch interface (CSIX) format (Common Switch Interface Specification-L1, August 2000), data sets received from the network are transmitted through the switching fabric by dividing the data sets into segments and placing the segments in CSIX frames (c-frames). These c-frames are interleaved with c-frames containing other data sets. The ingress processors transmit these c-frames across the switching fabric to the egress processors. The egress processors need a quick and efficient method for collecting and recompiling the data set segments.

DETAILED DESCRIPTION

A system and method for reassembling c-frames into coherent packets are disclosed. C-frames contain segments of a data set. A micro-engine operating on multiple threads copies the data set segments into assigned queues, following a thread hierarchy to keep the segments in order. The queues may be stored in static random access memory (SRAM). The micro-engine maintains a subset of the total number of queues in local memory. If a segment belongs to a queue not in local memory, the least recently used queue is copied to SRAM, the required queue is read from SRAM, and the queue is updated with the data set segment.

Figure 1:
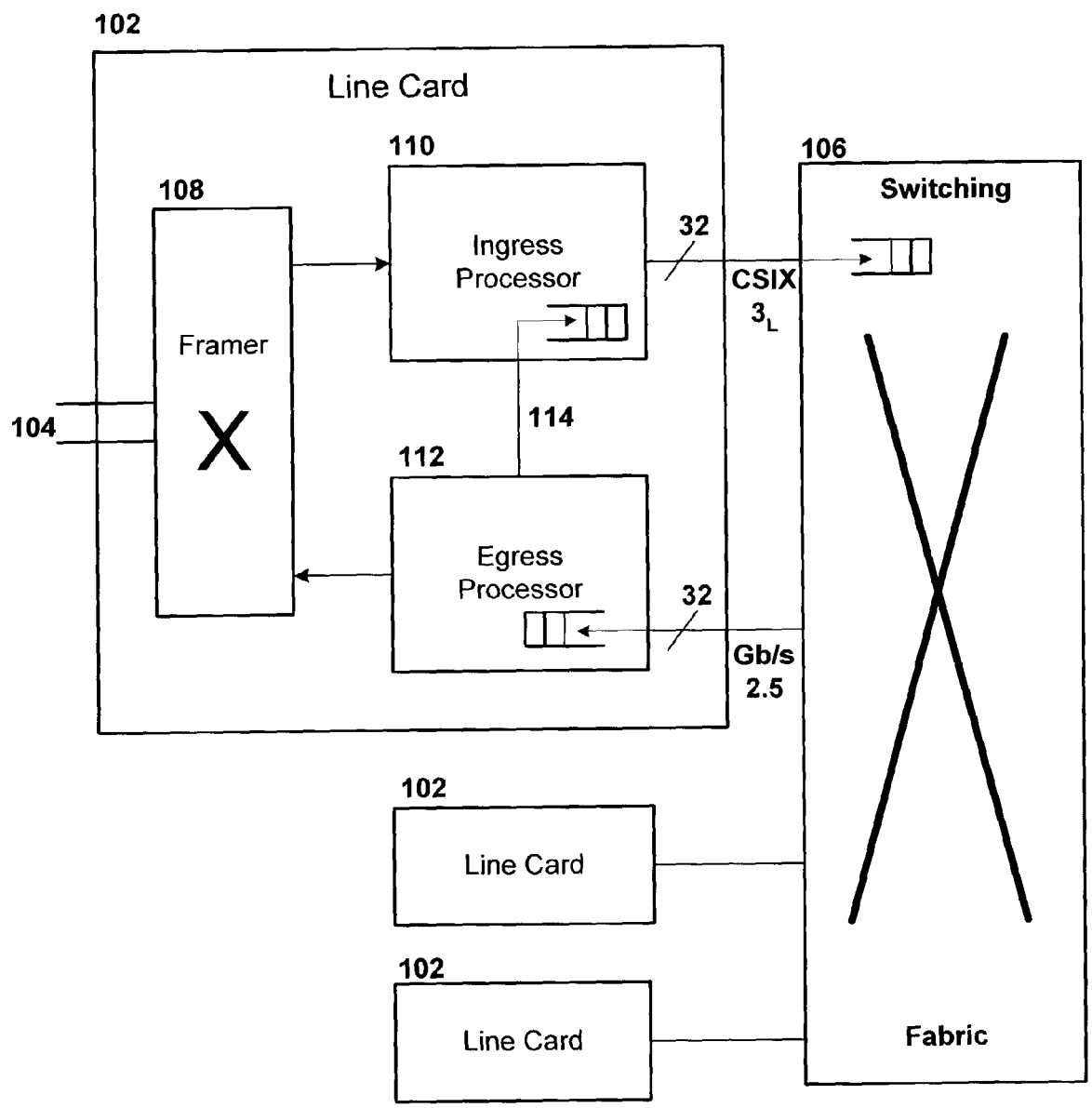
FIG. 1 provides an illustration of a prior art line card interfacing with a switching fabric.

One embodiment of a line card 102 used to process data on a network line is illustrated in FIG. 1. Each line card acts as an interface between a network 104 and a switching fabric 106. The line card 102 receives a data set from the network 104 via a framer 108. The framer 108 converts the data set from the format used by the network, which may include segmenting the data set, to a format for processing. The converted data set is then transmitted to an ingress processor 110. The ingress processor 110 performs necessary processing on the data set before being forwarded to the switching fabric 106. This processing may include further translation, encryption, error checking, and the like. After processing, the ingress processor 110 converts the data set into a transmission format for transmission across the switching fabric 106, then transmits the data set to the switching fabric 106. The transmission format may be common switch interface (CSIX) format (Common Switch Interface Specification-L1, August 2000), or a different format.

The line card 102 also allows a data set to be transmitted from the switching fabric 106 to the network 104. An egress processor 112 receives a data set from the switching fabric 106, processes the data set, and then transmits the data set to the framer 108. The framer 108 converts the data set into the network format. The network format can be asynchronous transfer mode (ATM; Multiprotocol Over ATM, Version 1.0, July 1998) or a different format.

A CSIX bus (CBUS) 114 carries flow control information from the egress processor to the ingress processor. CSIX link level or fabric level flow control messages that originate in either the switch fabric or the egress processor are transmitted over the CBUS.

Figure 2:
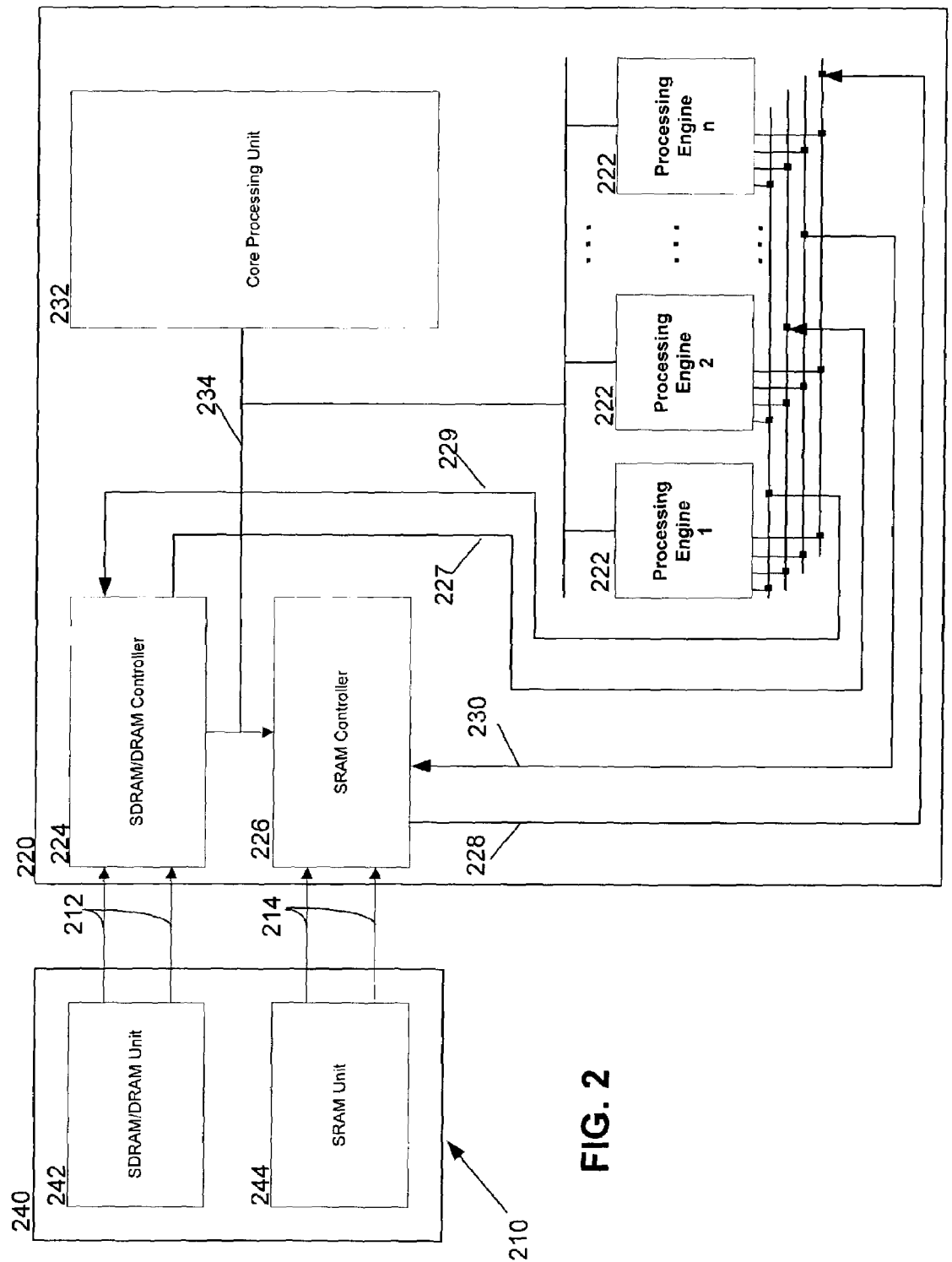
FIG. 2 provides an illustration of one embodiment of a processor.

FIG. 2 is a block diagram of a processing system, in accordance with an embodiment of the present invention. In FIG. 2, a computer processor system 210 may include a parallel, hardware-based multithreaded network processor 220 coupled by a pair of memory buses 212, 214 to a memory system or memory resource 240. Memory system 240 may include a synchronous dynamic random access memory (SDRAM) unit 242 and a static random access memory (SRAM) unit 244. The processor system 210 may be especially useful for tasks that can be broken into parallel subtasks or operations. Specifically, hardware-based multithreaded processor 220 may be useful for tasks that require numerous simultaneous procedures rather than numerous sequential procedures. Hardware-based multithreaded processor 220 may have multiple microengines or processing engines 222 each processing multiple hardware-controlled threads that may be simultaneously active and independently worked to achieve a specific task.

Processing engines 222 each may maintain program counters in hardware and states associated with the program counters. Effectively, corresponding sets of threads may be simultaneously active on each processing engine 222.

In FIG. 2, in accordance with an embodiment of the present invention, multiple processing engines 1-n 222, where (for example) n=8, may be implemented with each programming engine 222 having capabilities for processing eight hardware threads or contexts. The eight processing engines 222 may operate with shared resources including memory resource 240 and bus interfaces. The hardware-based multithreaded processor 220 may include a SDRAM/dynamic random access memory (DRAM) controller 224 and a SRAM controller 226. SDRAM/DRAM unit 242 and SDRAM/DRAM controller 224 may be used for processing large volumes of data, for example, processing of network payloads from network packets. SRAM unit 244 and SRAM controller 226 may be used in a networking implementation for low latency, fast access tasks, for example, accessing look-up tables, core processor memory, and the like.

In accordance with an embodiment of the present invention, push buses 227, 228 and pull buses 229, 230 may be used to transfer data between processing engines 222 and SDRAM/DRAM unit 242 and SRAM unit 244. In particular, push buses 227, 228 may be unidirectional buses that move the data from memory resource 240 to processing engines 222 whereas pull buses 229, 230 may move data from processing engines 222 to their associated SDRAM/DRAM unit 242 and SRAM unit 244 in memory resource 240.

In accordance with an embodiment of the present invention, eight processing engines 222 may access either SDRAM/DRAM unit 242 or SRAM unit 244 based on characteristics of the data. Thus, low latency, low bandwidth data may be stored in and fetched from SRAM unit 244, whereas higher bandwidth data for which latency is not as important, may be stored in and fetched from SDRAM/DRAM unit 242. Processing engines 222 may execute memory reference instructions to either SDRAM/DRAM controller 224 or SRAM controller 226.

In accordance with an embodiment of the present invention, the hardware-based multithreaded processor 220 also may include a core processing unit 232 for loading microcode control for other resources of the hardware-based multithreaded processor 220. In this example, core processing unit 232 may have a XScale™-based architecture manufactured by Intel Corporation of Santa Clara, Calif. A processor bus 234 may couple core processing unit 232 to SDRAM/DRAM controller 224 and SRAM controller 226.

The core processing unit 232 may perform general purpose computer type functions such as handling protocols, exceptions, and extra support for packet processing where processing engines 222 may pass the packets off for more detailed processing such as in boundary conditions. Core processing unit 232 may execute operating system (OS) code. Through the OS, core processing unit 232 may call functions to operate on processing engines 222. Core processing unit 232 may use any supported OS, such as, a real time OS. In an embodiment of the present invention, core processing unit 232 may be implemented as an XScale™ architecture, using, for example, operating systems such as VXWorks operating system from Wind River International of Alameda, Calif.; µC/OS operating system, from Micrium, Inc. of Weston, Fla., etc.

Advantages of hardware multithreading may be explained in relation to SRAM or SDRAM/DRAM accesses. As an example, an SRAM access requested by a thread from one of processing engines 222 may cause SRAM controller 226 to initiate an access to SRAM unit 244. SRAM controller 226 may access SRAM memory unit 226, fetch the data from SRAM unit 226, and return data to the requesting programming engine 222.

During a SRAM access, if one of processing engines 222 had only a single thread that could operate, that one programming engine would be dormant until data was returned from the SRAM unit 244.

By employing hardware thread swapping within each of processing engines 222 the hardware thread swapping may enable other threads with unique program counters to execute in that same programming engine. Thus, a second thread may function while the first may await the read data to return. During execution, the second thread accesses SDRAM/DRAM unit 242. In general, while the second thread may operate on SDRAM/DRAM unit 242, and the first thread may operate on SRAM unit 244, a third thread, may also operate in a third one of processing engines 222. The third thread may be executed for a certain amount of time until it needs to access memory or perform some other long latency operation, such as making an access to a bus interface. Therefore, processor 220 may have simultaneously executing bus, SRAM and SDRAM/DRAM operations that are all being completed or operated upon by one of the processing engines 222 and have more threads available to be processed.

The hardware thread swapping may also synchronize completion of tasks. For example, if two threads hit a shared memory resource, such as SRAM memory unit 244, each one of the separate functional units, such as SRAM controller 226 and SDRAM/DRAM controller 224, may report back a flag signaling completion of an operation upon completion of a requested task from one of the programming engine thread. Once the processing engine executing the requesting thread receives the flag, the processing engine may determine which thread to turn on.

In an embodiment of the present invention, the hardware-based multithreaded processor 220 may be used as a network processor. As a network processor, hardware-based multithreaded processor 220 may interface to network devices such as a Media Access Control (MAC) device, for example, a 10/100BaseT Octal MAC device or a Gigabit Ethernet device (not shown). In general, as a network processor, hardware-based multithreaded processor 220 may interface to any type of communication device or interface that receives or sends a large amount of data. Similarly, computer processor system 210 may function in a networking application to receive network packets and process those packets in a parallel manner.

Figure 3:
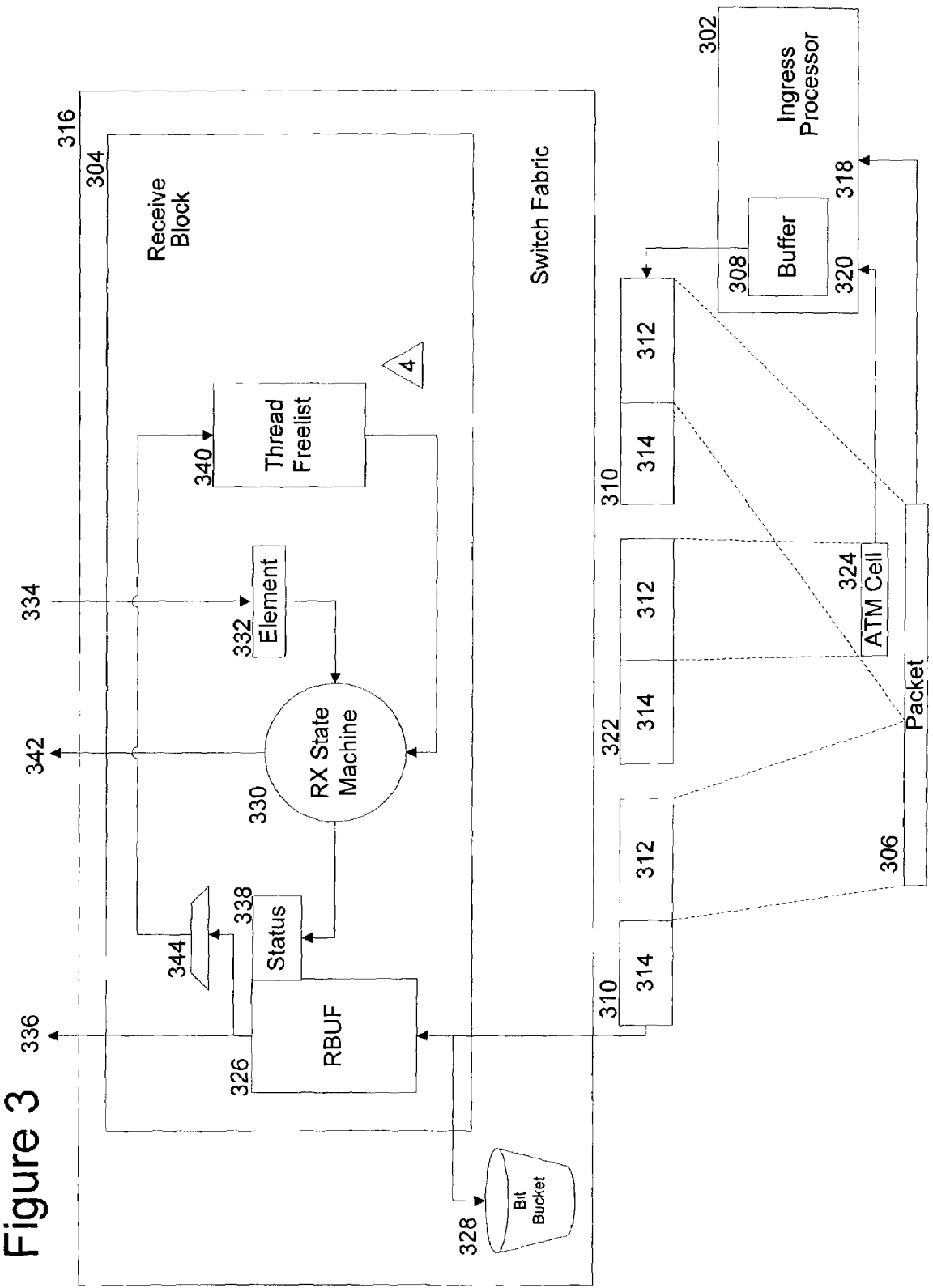
FIG. 3 provides a block diagram illustrating one embodiment of the interaction of the ingress processor and the egress processor.

FIG. 3 illustrates in a block diagram one embodiment of the interaction of an ingress processor 302 (e.g. such as processor 220 of FIG. 2) and a receive block 304 of the egress processor. As packets 306 arrive from the network, the ingress processor 302 stores the packets in a buffer 308, then segments the packet 306 into common switch interface (CSIX) c-frames 310. Each C-frame includes a payload 312 and a payload control 314. In one embodiment, the payload control 314 includes data to facilitate the c-frame movement through the switching fabric. In a further embodiment, the payload 312 includes, in addition to the data set segment, information such as a queue number that facilitates reassembly of the packet 306 after transmission. The ingress processor 302 provides a steady stream of c-frames 310 to the switching fabric 316. For example, media devices with a first port 318 and a second port 320 may interleave c-frames 322 for a data set 324 from the second port 320 with c-frames 310 for a data set 306 from the first port 318. In one embodiment, each port connects to a network using a different network format. The receive block 304 stores the incoming data in a receiver buffer (RBUF) 326. A bit bucket 328 times the data transmissions to ensure that no data is lost.

In one embodiment, the receive state machine (RSM) 330 receives the c-frame 310 and takes an element number 332 from the element free list 334 and moves the data in the RBUF 326 into the element 336. Status information is compiled for each element 332. The status information is transmitted to the status portion 338 of the RBUF 326. The RSM 330 then takes the top thread number from the thread first-in-first-out (FIFO) free list (e.g. a buffer) 340 and sends, or autopushes, the status 342 to the micro-engine (ME) (See FIG. 2). If the RSM does not see valid data during a pre-defined window, a null status is autopushed to the assigned thread. When the RSM fills an element 332, the element 332 is marked as busy and will not be used until the ME thread places the element back onto the element free list. Likewise, when a thread is assigned to process the element, the thread will not be assigned another task until the thread number 344 is written back to the thread free list 340.

In one embodiment, the frame reassembly ME writes the packet data to DRAM, including the internet protocol header information for data received on both a packet over synchronous optical network (SONET) (POS; SONET Interoperability Forum, 1994) interface as well as the CSIX interface. In one embodiment, the classification ME reads the header data from the DRAM when needed. The classification ME decides the size of the read burst depending on the application requirements. Once the frame assembly ME gets a signal that the data from the RBUF 326 has been written into DRAM, the ME will free up the RBUF element 336 by putting the element 336 back on the element free list 334.

Figure 4:
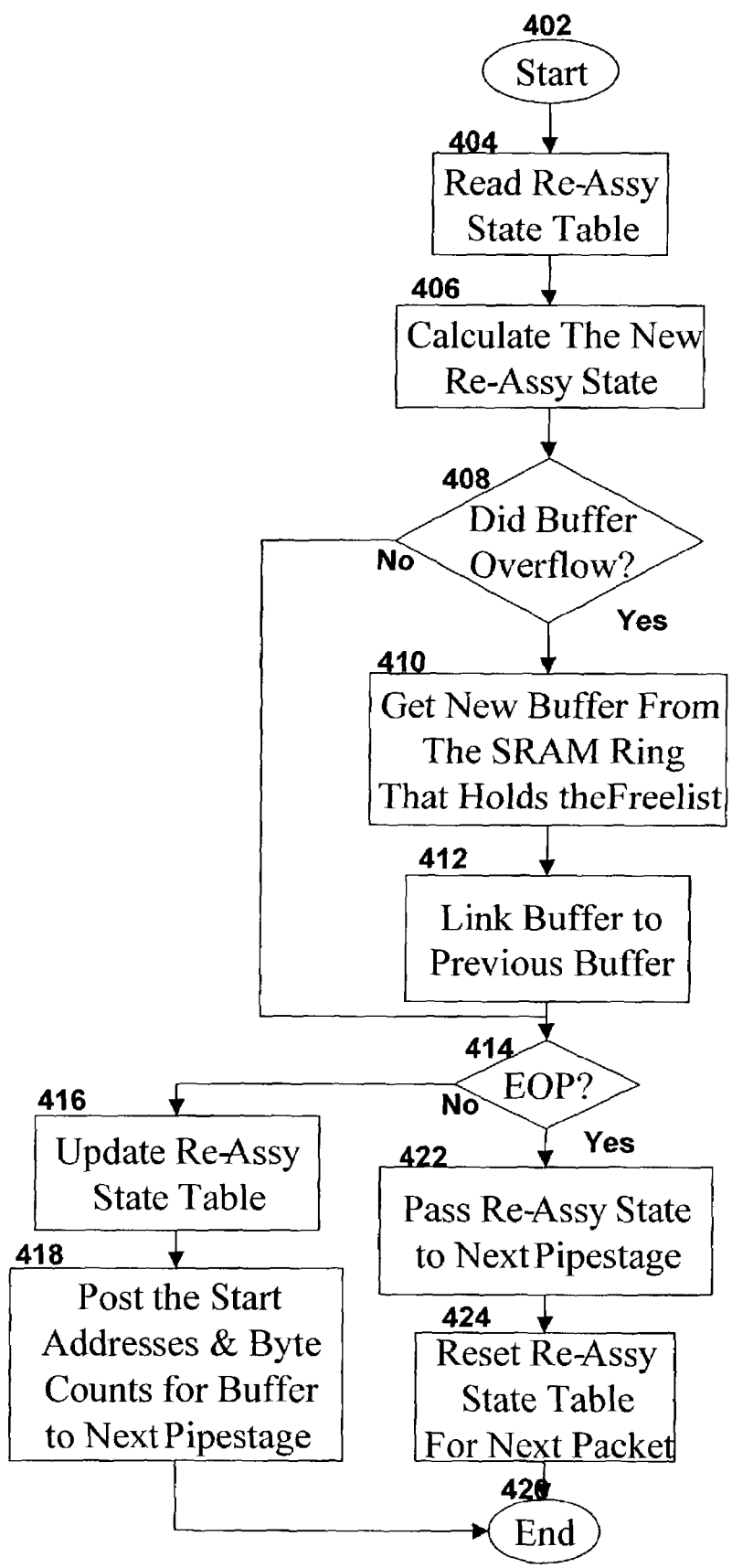
FIG. 4 describes in a flowchart one embodiment of a process for updating a receive buffer.

In this embodiment, managing the reassembly state involves allocating buffers and calculating offsets, byte counts, and other variables. In one embodiment, the micro-engine content addressable memory (CAM) is used to maintain coherency of the reassembly queue state between the multiple threads. FIG. 4 illustrates in a flowchart one embodiment of the pipe-stage program flow for the RBUF update. The thread starts (Block 402) by reading the reassembly state table (Block 404). The new reassembly state is calculated (Block 406). If the buffer overflowed (Block 408), a new buffer is gotten from the SRAM ring that holds the free list (Block 410). The new buffer is linked to the previous buffer (Block 412), and the pointer is checked to see if the end of the packet is reached (Block 414). If the buffer did not overflow (Block 408), the pointer is still checked to see if the end of the packet is reached (Block 414). If the end of the packet (EOP) is not reached (Block 414), the reassembly state table is updated (Block 416). The start addresses and the byte counts for the buffer are posted to the next pipe stage (Block 418), bringing the process to an end (Block 420). If the EOP is reached (Block 414), the reassembly state is passed to the next pipe stage (Block 422). The reassembly state table is reset for the next packet (Block 424), bringing the process to an end (Block 420).

Processing the threads is used to determine where and how much of the network data to write into the buffer. Multiple buffers can be used for large packets. If all the network data does not fit into the buffer, the execution of the thread gets a new buffer, places the remaining data into the new buffer and then links the new buffer to the previous buffer. The threads save the head and tail pointers in the reassembly state table until the entire packet is received. On receiving an end of packet signal, the thread passes the information to the next stage of the pipeline and eventually it is forwarded onto the queue manager (QM) pipe-stage that will enqueue the packet.

In one embodiment, the frame reassembly is implemented as a queue, or context, pipeline on a single ME running multiple threads. In a further embodiment, the single ME runs 8 threads. Each thread on the ME handles the reassembly on 1 RBUF element. In one embodiment, the total instruction budget for meeting the minimum POS packets is 88 ME cycles per second. This total instruction budget, combined with 8 threads per ME, results in a total latency of 704 ME cycles. For the system to keep up with the line rate, thread 0 should be done with the processing of element 0 by the time element 8 arrives into the system. The number of threads used by the system can be varied, which affects the total latency accordingly. The threads interact with each other to assure that the threads each operate in the proper order.

For the CSIX interface on the egress processor, any data element that is received could belong to any one of a number of virtual output queues, or contexts. The reassembly queues are resident in SRAM. In one embodiment, the SRAM stores 64,000 queues. The thread reads in the relevant queue to update the queue for the current data being received. To accelerate and optimize the performance of these read, modify, and write operations, the CAM in the ME may be used in conjunction with the local memory to cache the most recently used reassembly queue states.

In one embodiment of CSIX reassembly, the entire reassembly key is not part of the receive status word. The thread that handles the element issues an additional read to the RBUF element to get complete information. The pre-pend header information can be computed by the classification stage of the ingress processor and may contain the fabric source port identification, the destination port identification, the classification results, and other information. In one embodiment, the transmission process stage of the ingress pipeline appends this header to every c-frame that is sent out of the ingress processor. In the egress processor frame re-assembly stage, the relevant CSIX reassembly queue is determined based on this pre-pend information and the class identification information received in the c-frame extension header, which is forwarded as part of the receive status word.

Figure 5:
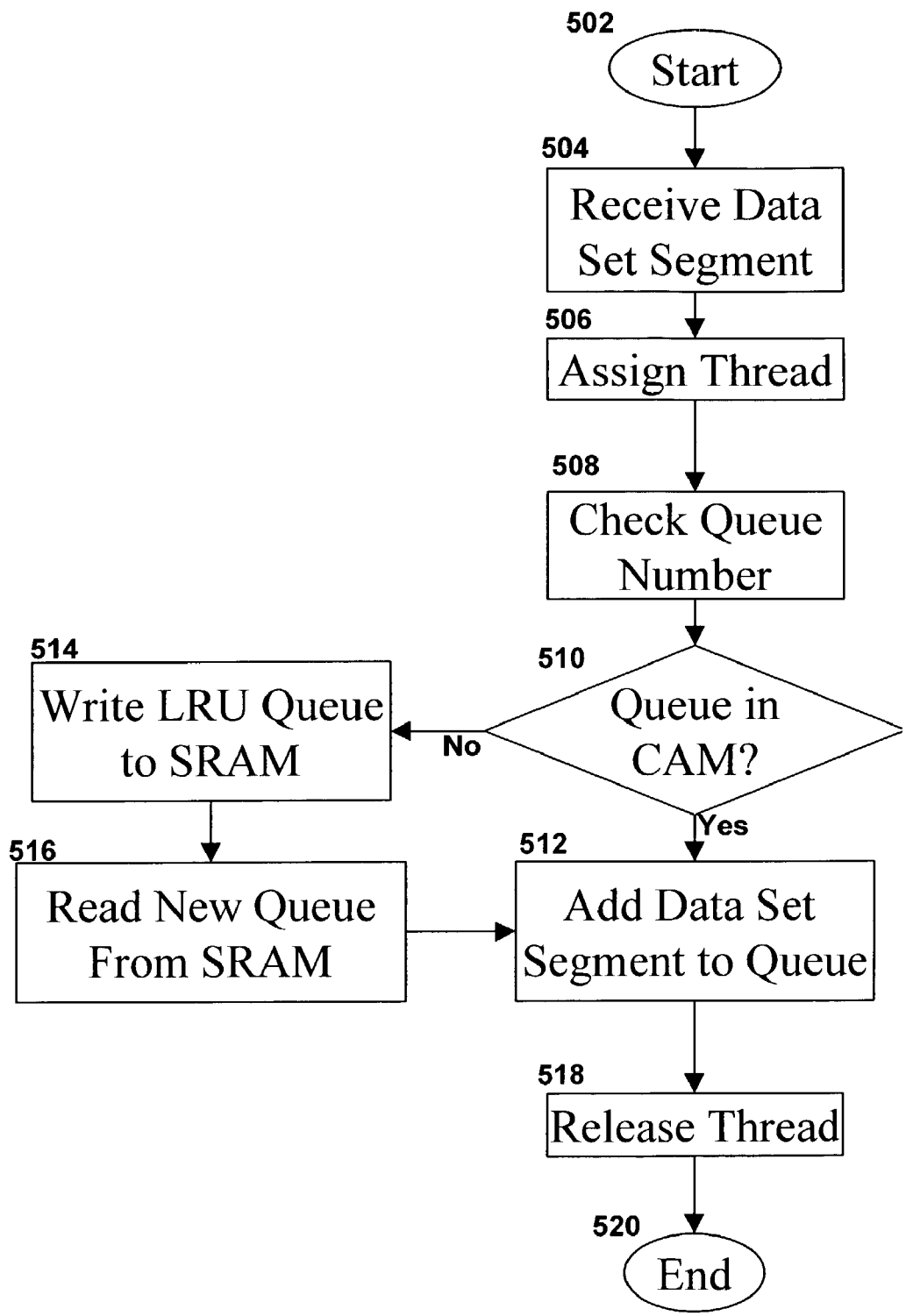
FIG. 5 describes in a flowchart one embodiment of a process for writing the data segments to a queue.

For the CSIX reassembly on the egress processor, the thread performs a CAM lookup in local memory using the reassembly key. One embodiment of the CSIX reassembly process is illustrated by the flowchart of FIG. 5. In this embodiment, the process begins (Block 502) when the processor receives a data set segment (Block 504). A thread from the thread free list is assigned to add the data set segment to a queue (Block 506). The queue number assigned to the data set by the ingress processor is checked (Block 508). The queue number is checked against the queues cached in the CAM of the micro-engine (Block 510). A CAM hit indicates that the reassembly queue is already in local memory, leftover from previous use by another thread. The data set segment is added to the assigned queue (Block 512). On a CAM miss, the thread evicts the returned least recently used (LRU) re-assembly queue from local memory, writing the queue back to SRAM (Block 514). In an alternative embodiment, a different algorithm is used to select which queue to write to SRAM. The thread then reads the required reassembly queue from SRAM (Block 516). The thread updates the CAM entry by adding the data set segment (Block 512). Upon completion of the update, the thread is released and added to the thread free list (Block 518), ending the process until the next data set segment is received (Block 520). In one embodiment, the thread is not released until its task is completed.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A processor, comprising:
  a micro-engine to execute a plurality of threads, each to add a segment of a data set received by the processor to a first queue of a first plurality of queues stored in a local memory of the micro-engine, wherein the local memory of the micro-engine is not available to other micro-engines in the processor; and
  a static random access memory (SRAM) to store a second plurality of queues, wherein the first plurality of queues is a subset of the second plurality of queues, wherein a queue number representing one of the second plurality of queues is associated with the data set, wherein the first queue is selected from the first plurality of queues based on the queue number associated with the data set, wherein, if the queue number does not match one of the first plurality of queues, the processor writes a least recently used queue to SRAM, reads a second queue of the second plurality of queues associated with the queue number from SRAM, and adds the segment of the data set to the second queue.

2. The processor of claim 1, wherein a port number associated with the processor is appended to the data set.

3. The processor of claim 1, wherein the processor receives the segment of the data set from a switching fabric.

4. The processor of claim 1, wherein the queue is assigned to the segment of the data set by a second processor which converted the data set into segments.

5. The processor of claim 1, wherein the segment of the data set is formatted in a common switch interface format.

6. A system, comprising:
  a first line card, including:
    a first processor with a first micro-engine to separate a first data set into segments;
  a second line card, including:
    a second processor with a second micro-engine to include a plurality of threads to add the segments of the data set to a first queue of a first plurality of queues stored in a local memory of the second micro-engine, wherein the local memory of the micro-engine is not available to other micro-engines in the processor, wherein the second processor includes a static random access memory (SRAM) to store a second plurality of queues, wherein the first plurality of queues is a subset of the second plurality of queues, wherein a queue number representing one of the second plurality of queues is associated with the data set, wherein a thread of the plurality of threads chooses the first queue from the first plurality of queues based on the queue number associated with the data set, wherein, if the queue number does not match one of the first plurality of queues, the thread writes a least recently used queue to SRAM, reads from SRAM a second queue of the second plurality of queues associated with the queue number, and adds the segment of the data set to the second queue; and
  a switching fabric to transmit the segments of the data set from the first processor to the second processor.

7. The system of claim 6, wherein a port number associated by the first processor with the second line card is associated with the data set.

8. The system of claim 6, wherein the queue is assigned to the segments of the data set by the first processor.

9. The system of claim 6, wherein the segments of the data set is formatted in a common switch interface format for transmission across the switching fabric.

10. A method, comprising:
  separating a first data set into segments;
  receiving in a processor the segments of the data set;
  adding the segments of a data set to a first queue of a first plurality of queues stored in a local memory of a micro-engine of the processor, wherein the local memory of the micro-engine is not available to other micro-engines in the processor, wherein the processor includes a static random access memory (SRAM) to store a second plurality of queues, wherein the first plurality of queues is a subset of the second plurality of queues;
  associating a queue number representing one of the second plurality of queues with the data set;
  choosing the first queue from the first plurality of queues based on the queue number associated with the data set;
  writing a least recently used queue to SRAM;
  reading a second queue of the second plurality of queues associated with the queue number from SRAM; and
  adding the segments of the data set to the second queue if the queue number does not match one of the first plurality of queues.

11. The method of claim 10, further including associating a port number representing the processor with the data set.

12. The method of claim 10, wherein the segments of the data set are transmitted from the first processor to the second processor via a switching fabric.

13. The method of claim 10, further including formatting the segments of the data set in a common switch interface format.

14. A set of instructions residing in a storage medium, said set of instructions capable of being executed by a processor to implement a method for reassembling a data set, the method comprising:
  separating a first data set into segments;
  receiving in a processor the segments of the data set;
  adding the segments of a data set to a first queue of a first plurality of queues stored in a local memory of a micro-engine of the processor, wherein the local memory of the micro-engine is not available to other micro-engines in the processor, wherein the processor includes a static random access memory (SRAM) to store a second plurality of queues, wherein the first plurality of queues is a subset of the second plurality of queues;
  associating a queue number representing one of the second plurality of queues with the data set;
  choosing the first queue from the first plurality of queues based on the queue number associated with the data set;
  writing a least recently used queue to SRAM;
  reading a second queue of the second plurality of queues associated with the queue number from SRAM; and
  adding the segments of the data set to the second queue if the queue number does not match one of the first plurality of queues.

15. The set of instructions of claim 14, further including associating a port number representing the processor with the data set.

16. The set of instructions of claim 14, wherein the segments of the data set are transmitted from the first processor to the second processor via a switching fabric.

17. The set of instructions of claim 14, further including formatting the segments of the data set in a common switch interface format.

* * * * *